United States Patent
Tann et al.

(10) Patent No.: US 9,268,579 B2
(45) Date of Patent: Feb. 23, 2016

(54) SYSTEMS AND METHODS FOR ACCURATE INITIALIZATION FROM LOW-POWER AND POWER-OFF STATES

(71) Applicant: Apple Inc., Cupertino, CA (US)

(72) Inventors: Christopher P. Tann, San Jose, CA (US); Marc Albrecht, San Francisco, CA (US); Keith Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 13/906,175

(22) Filed: May 30, 2013

(65) Prior Publication Data

US 2014/0359257 A1 Dec. 4, 2014

(51) Int. Cl.
*G06F 9/24* (2006.01)
*G06F 15/177* (2006.01)
*G06F 9/44* (2006.01)
*G06F 1/32* (2006.01)
*G09G 5/10* (2006.01)
*G06F 3/0346* (2013.01)

(52) U.S. Cl.
CPC .............. *G06F 9/4411* (2013.01); *G06F 1/325* (2013.01); *G09G 5/10* (2013.01); *G06F 1/3203* (2013.01); *G06F 1/3206* (2013.01); *G06F 1/3218* (2013.01); *G06F 1/3231* (2013.01); *G06F 1/3265* (2013.01); *G06F 3/0346* (2013.01); *G06F 2200/1637* (2013.01); *G09G 2320/041* (2013.01); *G09G 2330/026* (2013.01)

(58) Field of Classification Search
CPC ... G06F 1/3203; G06F 1/3206; G06F 1/3218; G06F 1/3231; G06F 1/3265; G06F 3/0346
USPC .......................... 713/1, 2, 100, 300, 320, 323
See application file for complete search history.

(56) References Cited

U.S. PATENT DOCUMENTS

| | | | |
|---|---|---|---|
| 7,551,911 B2 | 6/2009 | Shohara et al. | |
| 7,882,382 B2 | 2/2011 | Aksamit et al. | |
| 8,438,408 B2 | 5/2013 | Louboutin et al. | |
| 2003/0051182 A1* | 3/2003 | Tsirkel et al. | 713/320 |
| 2007/0219644 A1* | 9/2007 | Sonobe | 700/12 |
| 2009/0006574 A1 | 1/2009 | Horvitz et al. | |
| 2013/0054998 A1 | 2/2013 | Wyatt et al. | |

* cited by examiner

*Primary Examiner* — Michael J Brown
(74) *Attorney, Agent, or Firm* — Downey Brand LLP (57) ABSTRACT

This paper describes various embodiments that relate to personal computer systems, and accurate initialization of computer hardware of personal computer systems from a low-power and/or power-off state. According to one embodiment of the invention, a computer system includes a device operative to be powered down to the power-off state dependent upon an amount of user activity on the computer system. The computer system also includes a device controller operative to initialize the device from the power-off state to a power-on state responsive to user activity on the computer system. The device controller has at least one sensor device operative to determining a physical variable related to the device, and operating characteristics of the device are related to the physical variable.

20 Claims, 7 Drawing Sheets

SYSTEMS AND METHODS FOR ACCURATE INITIALIZATION FROM LOW-POWER AND POWER-OFF STATES

FIELD OF THE DESCRIBED EMBODIMENTS

The described embodiments relate generally to personal computer systems, and more particularly, to systems and methods for accurate recovery from low-power and power-off states.

BACKGROUND

Conventionally, to reduce power consumption in personal computer systems including desktops, laptops, and other devices, displays and other hardware are often powered down to a low-power, sleep, and/or power-off state during periods of inactivity or reduced activity. During a power-off state, environmental conditions may cause a temperature and other variables associated with the powered-down hardware to change. For example, as a display is powered-down, its temperature may eventually reach equilibrium with an external environment. Depending upon the temperature of equilibrium, several operating characteristics of the display may be affected.

For example, at differing temperatures backlighting and associated hardware may require more or less voltage for appropriate initialization and intensity level production. Furthermore, liquid-crystal subpixel switching speeds are dependent on diffusion from one state to another, which is also a strong function of temperature. Moreover, contrast ratios, color temperature, color balance, and many other attributes may be affected by temperature.

Generally, if a display is fully initialized, subroutines may function to balance operational characteristics to actual real-time variable values to promote a rich user experience. However, as noted above, temperature may vary during power-off states. Furthermore, a time delay from power-off to full initialization of the display may be significantly larger than a time delay from power-off to initial video output of the display. During initiation or wake-up from a power-off state, actual temperature and other variables may be significantly different than a default state; however initial video output may be based on the default state values due to lack of full initialization of the display. Therefore, a user may experience perceptual differences in display output upon waking up a display from a power-off state until the display is fully initialized and subroutines begin correcting for real-time temperature and other variables associated with the display.

Accordingly, there is a need to stabilize and more accurately initialize displays and other computer hardware from low-power and power-off states.

SUMMARY OF THE DESCRIBED EMBODIMENTS

This paper describes various embodiments that relate to personal computer systems, and accurate initialization of computer hardware of personal computer systems from a low-power and/or power-off state.

According to one embodiment of the invention, a computer system includes a device operative to be powered down to a power-off state dependent upon an amount of user activity on the computer system. The computer system also includes a device controller operative to initialize the device from the power-off state to a power-on state responsive to user activity on the computer system. The device controller has at least one sensor device operative to determining a physical variable related to the device, and operating characteristics of the device are related to the physical variable.

According to another embodiment of the invention, a method of initializing computer hardware from a power-off state to a power-on state includes detecting a value of a physical variable related to operational characteristics of the computer hardware, comparing the detected value of the physical variable to a threshold, and initializing the computer hardware to the power-on state based on the comparing.

According to yet another embodiment of the invention, a method of initializing a display device from a power-off state to a power-on state includes detecting a value related to a current temperature of a display controller of the display device, comparing the detected value to at least one threshold, and initializing the display device to the power-on state based on the comparing.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

According to embodiments of the invention, systems and methods are provided which more accurately initialize computer hardware from a low-power and/or power-off state. For example, computer hardware such as displays may enter a low-power or power-off state during periods of inactivity based on a plurality of factors, such as lack of movement of a mouse or inactivity of a keyboard or input device. Based on these factors, a display may be powered-down to reduce power consumption through deactivation of a power supply and/or other associated devices. While the display is powered-down, its temperature may eventually reach equilibrium with an external environment. To reinitialize the display or power it back up, exemplary embodiments of the invention take into consideration an estimated or detected display temperature (or any other applicable variable) to determine an appropriate range of operational characteristics by which to operate the display until the display is fully initialized, and thereafter associated subroutines can adjust the display's operational characteristics based on actual, real-time measurements of the variable which govern its operation (i.e., temperature). This appropriate range of operational characteristics may be based on a rough estimate of temperature and temperature-dependent operating characteristics, such as, for example, temperature, pressure, humidity, etc. The estimated display temperature may be based upon a resistance measurement, a voltage-drop associated with a diode, a sensor reading, a current drain reading, or any other readily accessible information not dependent upon full initialization of the display hardware. For example, according to one embodiment of the invention, the estimated display temperature is based on a reading from a sensor embedded on a display controller die or chip. Thereafter, the display is initialized based on display characteristics associated with a temperature range inclusive of (or near to) the detected value of temperature read from the sensor. Hereinafter, exemplary embodiments of the present invention are described in detail with reference to the many drawings.

Figure 1:
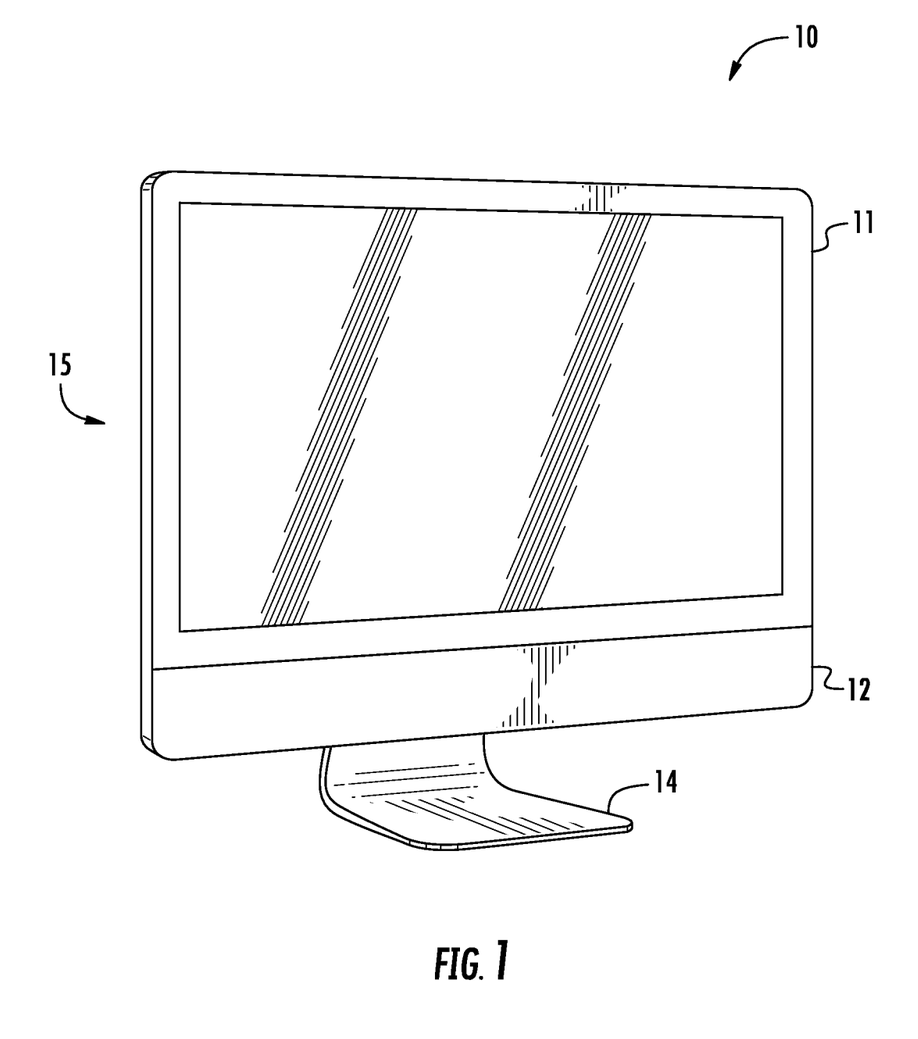
FIG. 1 illustrates an example personal computer system.

Turning to FIG. 1, an example personal computer system 10 is illustrated. The system 10 may include a display 11 attached to a housing 12, supported by a stand 14. The housing 12 may house a plurality of display and computer hardware generally indicated at 15. During operation of the system 10, temperature of the hardware 15 may vary widely from ambient temperature, for example, due to dissipation of heat from a plurality of electronic components. As the temperature varies, subroutines may access real-time measurements of temperature (and associated variables) to adjust the operational characteristics of the display 11 to enhance and enrich a user's perception of the display 11. For example, switching speed, backlight intensity, contrast ratio, color balance, and other operational characteristics may be adjusted in real time to maintain a uniform and desirable display of graphical elements for the user to interact with. After a period of inactivity, in order to reduce power consumption, the display 11 (or other hardware 15) may be powered down to a sleep, low-power, or power-off state. Depending upon when a user resumes activity on the system 10, the temperature and other physical variables associated with the system 10 may have changed. Therefore, during reinitializing of the system 10 from the power-off state, a portion of the system 10 may take into consideration an estimate of an actual temperature of the system for setting operational characteristics of the display 11 and/or other hardware 15. This estimate is further described with reference to the schematic of FIG. 2 and the graphs of FIGS. 3-4, below.

Figure 2:
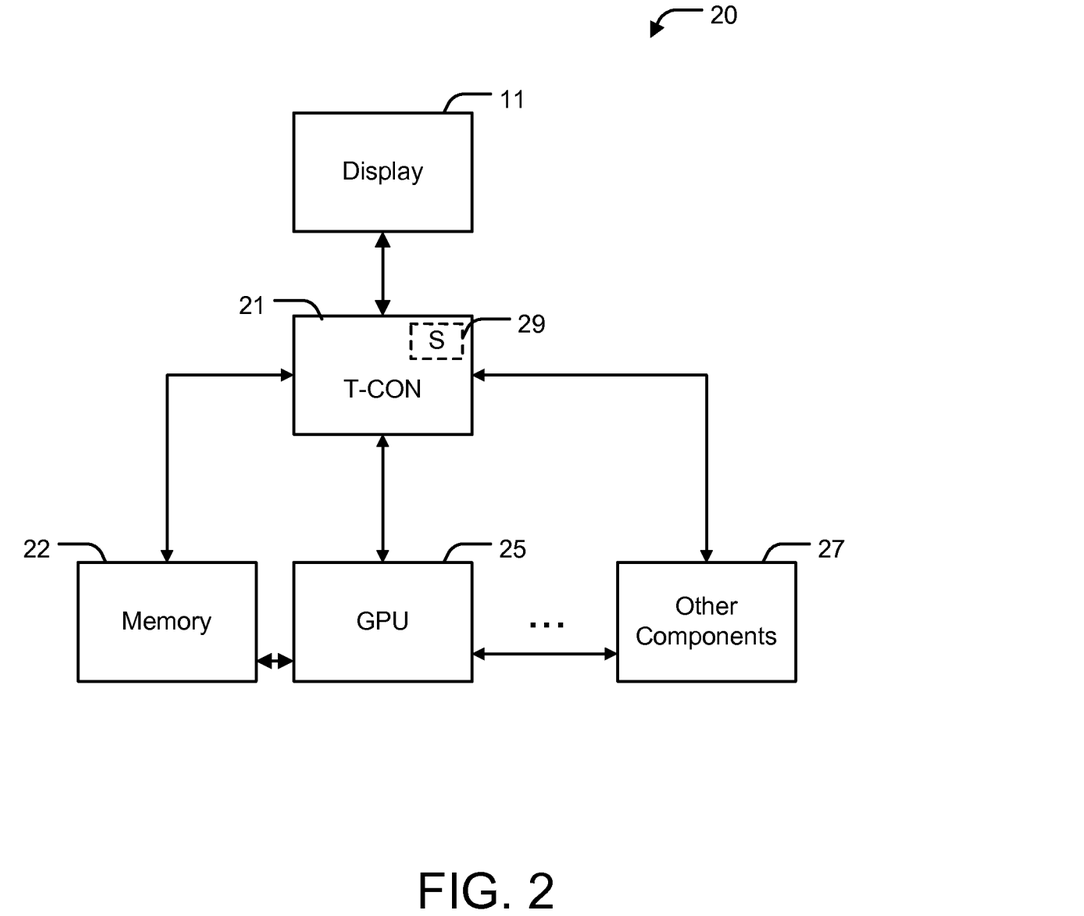
FIG. 2 is a schematic of a personal computer system, according to an exemplary embodiment of the invention.

FIG. 2 is a schematic of a personal computer system 20, according to an exemplary embodiment of the invention. As shown, the system 20 may include the display 11 coupled to timing controller (T-CON) 21. T-CON 21 may be in operative communication with memory 22, one or more graphics processing units (GPU) 25, and other computer components 27. Generally, T-CON 21 may direct the display 11 to output a video signal. For example, T-CON 21 may receive video image and frame data from various components in the system 20. As the T-CON 21 receives these signals, it may process them and send them out in a format that is compatible with a display 11 coupled to the T-CON 21. The display 11 may be any variety including liquid crystal displays (LCDs), plasma displays, cathode ray tubes (CRTs) or the like. Likewise, the format of the video data communicated from the T-CON 21 to the display 11 may include a wide variety of formats, such as display port (DP), low voltage differential signaling (LVDS), etc.

As further illustrated, T-CON 21 may include a separate or integrated sensor 29 embedded therein (for example, created directly in the die of the T-CON chip). The sensor 29 may be accessible to the T-CON 21 during any time at which the T-CON 21 is active. Therefore, in order to access the sensor 29, the T-CON 21 may simply read a signal associated therewith to ascertain sensor information. This is in contrast to information received from the other components 27, which is dependent upon the components being initialized.

According to at least one embodiment, the sensor 29 is a temperature sensor capable of relaying temperature information related to a temperature of the T-CON 21 die or chipset to the T-CON 21. This temperature information may be in the form of a resistance (correlated to temperature of conductors in the sensor), a voltage drop (correlated to resistance in the sensor), a voltage value of a P-N junction (i.e., temperature diode), or any other suitable form for processing by the T-CON 21. Upon receipt of the temperature information, the T-CON 21 may initialize the display 11 (e.g., from a power-off state) to an initial operating state based upon this temperature information. Hereinafter, differences between initial operating characteristics of computer hardware upon initialization from a power-off state are described in detail with reference to FIGS. 3-4.

Figure 3:
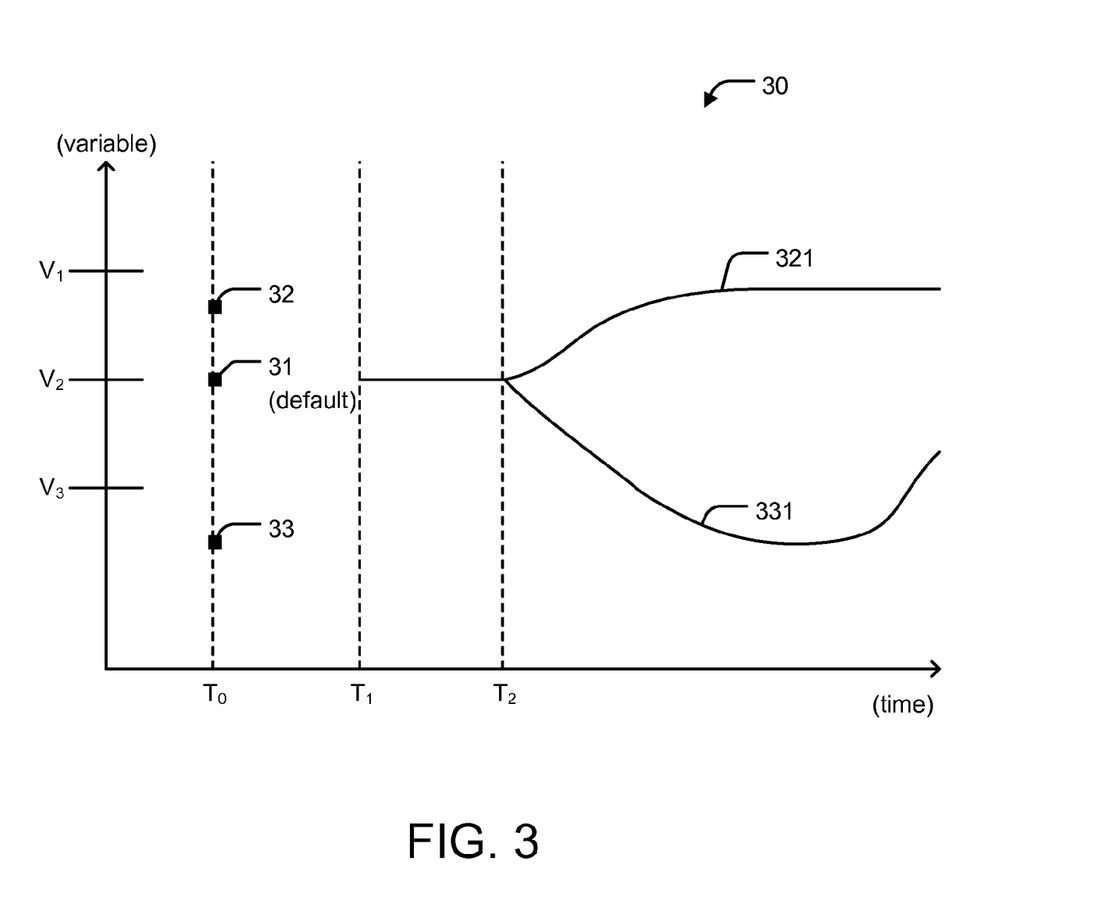
FIG. 3 is a graph illustrating operational characteristics of computer hardware initialized from a power-off state.

FIG. 3 is a graph 30 illustrating operational characteristics of computer hardware initialized from a power-off state. On graph 30, the X-axis represents time and $T_0$ denotes a time at which a request for initializing a display or other computer hardware from a power-off state is received (e.g., a user depresses a key or moves a mouse). $T_1$ denotes a time at which an associated display begins to output video (e.g., time where display turns on). $T_2$ denotes a time at which the display is fully initialized and/or capable of real-time adjustment to operating characteristics. The Y-axis represents a magnitude of a physical variable (e.g., temperature, pressure, humidity, etc) and $V_1$ denotes a high operational value, $V_2$ denotes a default or typical operational value, and $V_3$ denotes a low operational value. For example, $V_1$ may be an operational value of a variable during full utilization or heat dissipation, or where an external environment is of a relatively high temperature, pressure, humidity, etc. $V_2$ may be an operational value near an ideal or default value (e.g., ideal room temperature, pressure, humidity, etc). $V_3$ may be an operational value of a variable during low utilization or heat dissipation, or where an external environment is of a relatively low temperature, pressure, humidity, etc.

Generally, $T_0$, $T_1$, $T_2$, $V_1$, $V_2$, and $V_3$ may be predetermined values based on the actual computer hardware, and may vary across a plurality of different devices. For example, $T_0$, $T_1$, and $T_2$ may increase or decrease depending upon computer hardware resources or speed. $V_1$, $V_2$, and $V_3$ may increase or decrease depending upon a geographic location, interior or exterior equipment location, or other environmental variables. As such, these values may be adjusted, optimized, or determined based upon a plurality of factors including system configuration, customer location, and other factors, and therefore should not be limiting of exemplary embodiments. Furthermore, additional values or less values may be used to implement exemplary embodiments, and accordingly the actual number of values displayed should not be construed as limiting.

According to graph 30, a device may be initialized at a default value of 31, which is near an ideal or desired ideal operating characteristics. For example, this may include an average room temperature of 31 degrees Celsius, at standard pressure and/or humidity. According to some embodiments only temperature is considered. According to other embodiments pressure and/or humidity is considered. According to still other embodiments, other variables may or may not be considered. However, if the device variable is actually nearer to value 32 when initialized, the operational characteristics may follow curve 321, which includes relatively large changes in characteristics after time $T_2$, which may be easily discernable to a user, and therefore diminish the user's experience. Similarly, if the device variable is actually nearer to value 33 when initialized, the operational characteristics may follow curve 331, which also includes relatively large changes in characteristics after time $T_2$, which may also be easily discernable to a user, and therefore also diminish the user's experience.

Figure 4:
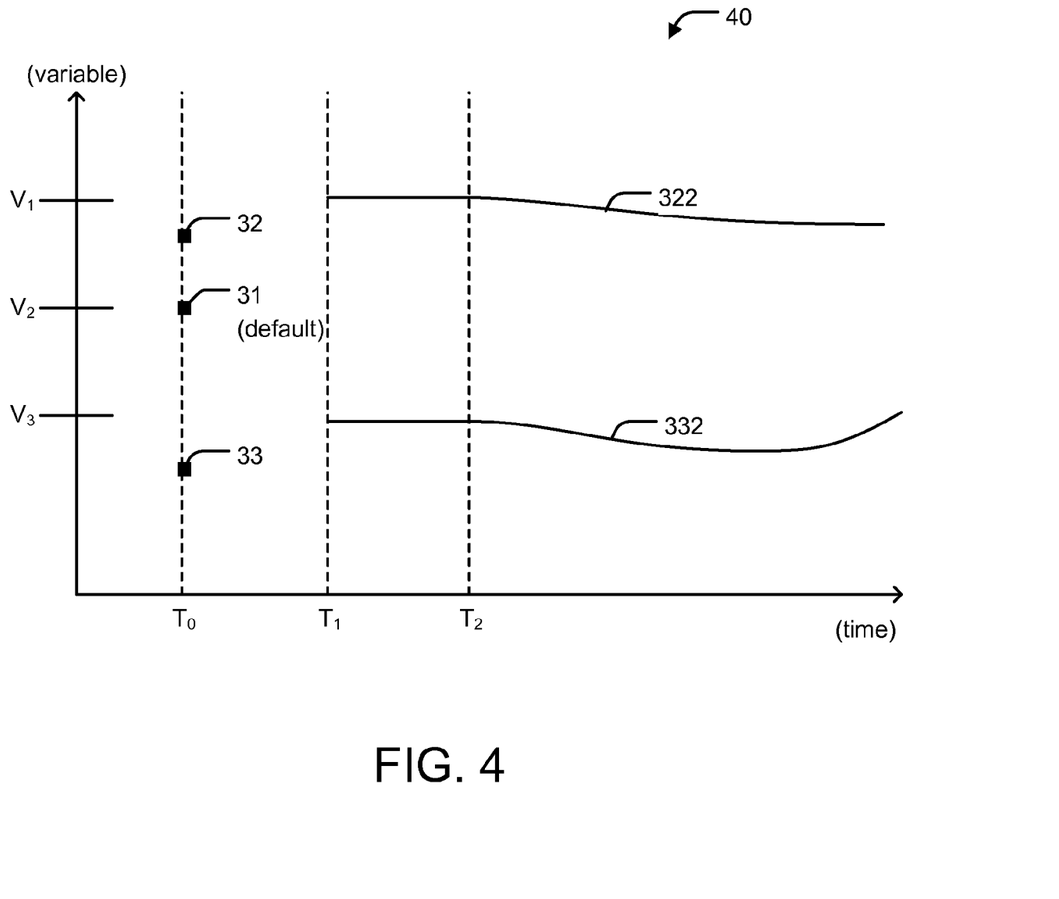
FIG. 4 is a graph illustrating operational characteristics of computer hardware initialized from a power-off state, according to an exemplary embodiment of the invention.

Turning to FIG. 4, graph 40 illustrating operational characteristics of computer hardware initialized from a power-off state, according to an exemplary embodiment of the invention, is provided. According to graph 40, if the device is instead initialized with a default or initial operating characteristic related to value $V_1$ when the actual device variable is 32, changes in operating characteristics after time $T_2$ (curve 322) are reduced compared to graph 30 (curve 321). This enhances a user experience as changes in perception are reduced. Furthermore, if the device is initialized with a default or initial operating characteristic related to value $V_3$ when the actual device variable is 33, changes in operating characteristics after time $T_2$ (curve 332) are also reduced as compared to graph 30 (curve 331).

According to exemplary embodiments of the present invention, the actual values 32 and 33 may be received from sensor 29 between time $T_0$ and time $T_1$. Thereafter, the operating characteristics of the device may be initialized at time $T_1$ (or beforehand) to be closer to values $V_1$, $V_2$, or $V_3$ depending upon the received values. Generally it is understood that readings from the sensor 29 may be imperfect, have a wide range of fluctuation, or may overshoot/undershoot the actual variable value. However, given a threshold approach described herein, the initial operating characteristics may still be closer to actual operational characteristics as compared to the conventional approach of using a single, default operational initial value set. Accordingly, embodiments of the invention have perceived and tangible benefits to users of devices implementing the same. The threshold approach to determining initial operating characteristics is described more fully below with reference to FIGS. 5-7.

Figure 5:
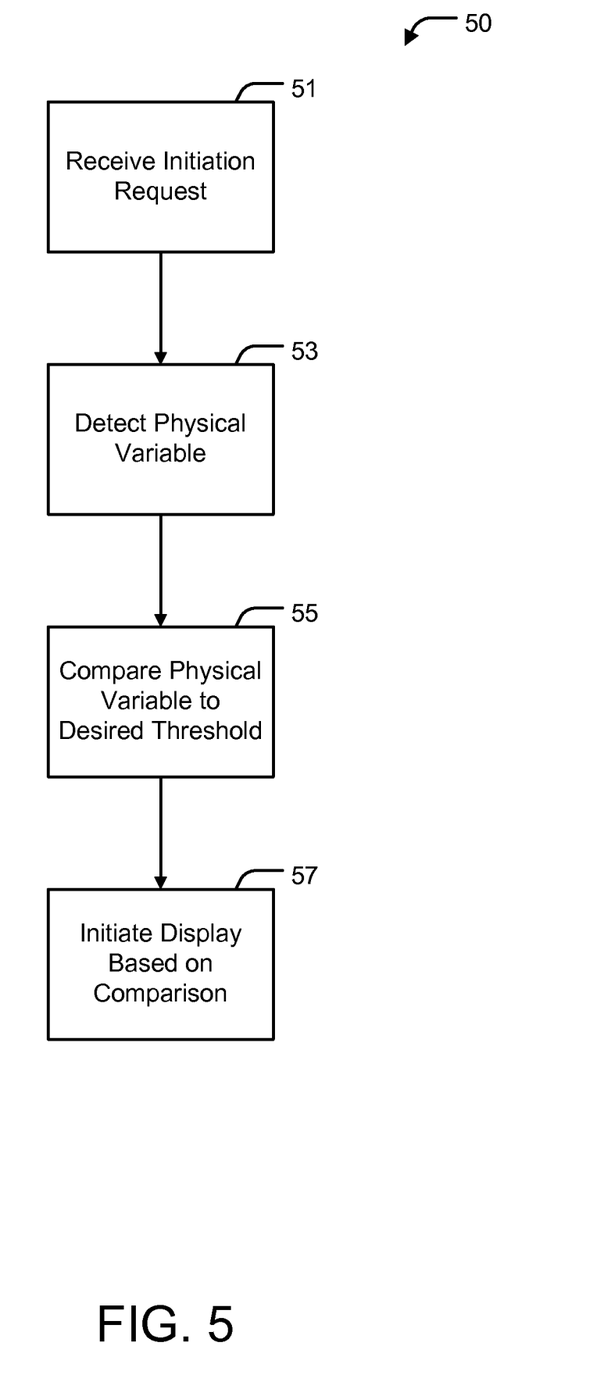
FIG. 5 is a flowchart of a method of initializing computer hardware from a power-off state, according to an exemplary embodiment of the invention.

FIG. 5 is a flowchart of a method 50 of initializing computer hardware from a power-off state to a power-on state, according to an exemplary embodiment of the invention. The method 50 includes receiving a request to initiate or power-on a device, display, or computer hardware from a standby, low-power, and/or power-off state at block 51. The request may be generated by a user interacting with a computer, for example, by moving a mouse or depressing a key. Upon receipt, the method 50 includes detecting a physical variable at block 53. Detecting the physical variable may include, for example, determining an elapsed time since power-off, taking a temperature reading, taking a pressure reading, accessing a sensor output, determining a resistance value, or any other suitable function as described above with reference to sensor 29 or as otherwise applicable to embodiments of the invention.

The method 50 further includes comparing the physical variable to one or more desired thresholds at block 55. The comparing may include determining if the detected value falls above or below one or more desired thresholds. The thresholds may include values $V_1$, $V_2$, and $V_3$ as described above. Alternatively, the thresholds may include more or less values than those described above.

Upon making the comparison, the method 50 includes initiating the device, display, and/or computer hardware based on the comparison at block 57. For example, if the comparison indicates the detected value is greater than a highest threshold, the initiating may occur at the highest threshold, allowing the system to be initialized closer to the actual value but not rely on accuracy of the detected value. Furthermore, if the comparison indicates the detected value is between the highest threshold and the lowest threshold, the initiating may occur at a middle threshold or lowest threshold, allowing the system to be initialized closer to the actual value but not rely on accuracy of the detected value. Additionally, if the comparison indicates the detected value is lower than a lowest threshold, the initiating may occur at the lowest threshold, again still allowing the system to be initialized closer to the actual value while not relying on accuracy of the detected value.

As described above, methods according to exemplary embodiments take into consideration a detected or measured value of a variable for initializing a system from a power-off state. According to some embodiments, this variable may be temperature (or a correlated value such as resistance, voltage drop, etc.) as described below with reference to FIG. 6.

Figure 6:
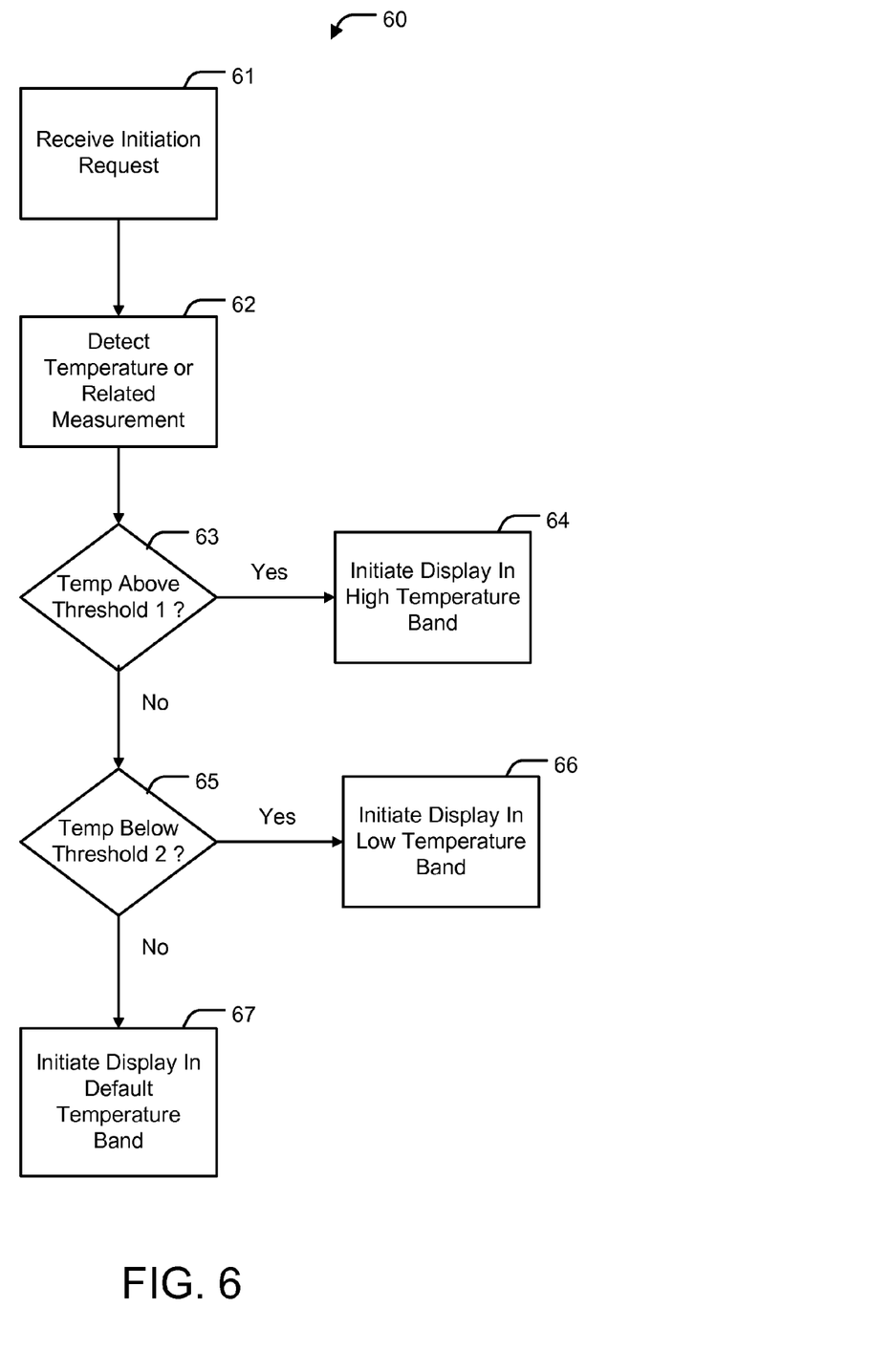
FIG. 6 is a flowchart of a method of initializing computer hardware from a power-off state, according to an exemplary embodiment of the invention.

FIG. 6 is a flowchart of a method 60 of initializing computer hardware from a power-off state to a power-on state, according to an exemplary embodiment of the invention. The method 60 includes receiving a request to initiate or power-on a device, display, or computer hardware from a standby, low-power, and/or power-off state at block 61. The request may be generated by a user interacting with a computer, for example, by moving a mouse or depressing a key. Upon receipt, the method 60 includes detecting a temperature or related measurement such as resistance at block 62. Detecting the temperature may include any suitable function as described above with reference to sensor 29 or as otherwise applicable to embodiments of the invention.

The method 60 further includes determining if the detected temperature is above a first threshold at block 63. If the detected temperature is above the first threshold, the method 60 includes initiating the device, display, or computer hardware in a high temperature band at block 64. Generally, the high temperature band may include a range of predetermined or desired values at or above the first threshold.

If the detected temperature is not above the first threshold, the method 60 includes determining if the detected temperature is below a second threshold at block 65. If the detected temperature is below the second threshold, the method 60 includes initializing the device, display, or computer hardware in a low temperature band at block 66. Generally, the low temperature band may include a range of predetermined or desired values at or below the second threshold.

If the detected temperature is not below the second threshold, the method 60 includes initializing the device, display, or computer hardware in a default or ideal temperature band. Generally, the default temperature band may include a range of predetermined or desired values at or near an ideal or desired operating temperature.

In some exemplary embodiments, the method 60 may be simplified or altered by omitting particular steps or operations. For example, according to one embodiment, blocks 65 and 66 may be omitted such that if the detected temperature is not above the first threshold, the method includes simply initiating at the default band illustrated in block 67. Furthermore, blocks 63 and 64 may also be omitted for comparison only to the second threshold, and otherwise defaulting. Still additional steps may be included, such that additional thresholds may be used in comparisons. Furthermore, although described above as related only to a measured or detected variable (such as a temperature), the same may be varied in many ways, for example, through estimation of a temperature due to a lapse of time from deactivation of a device.

Figure 7:
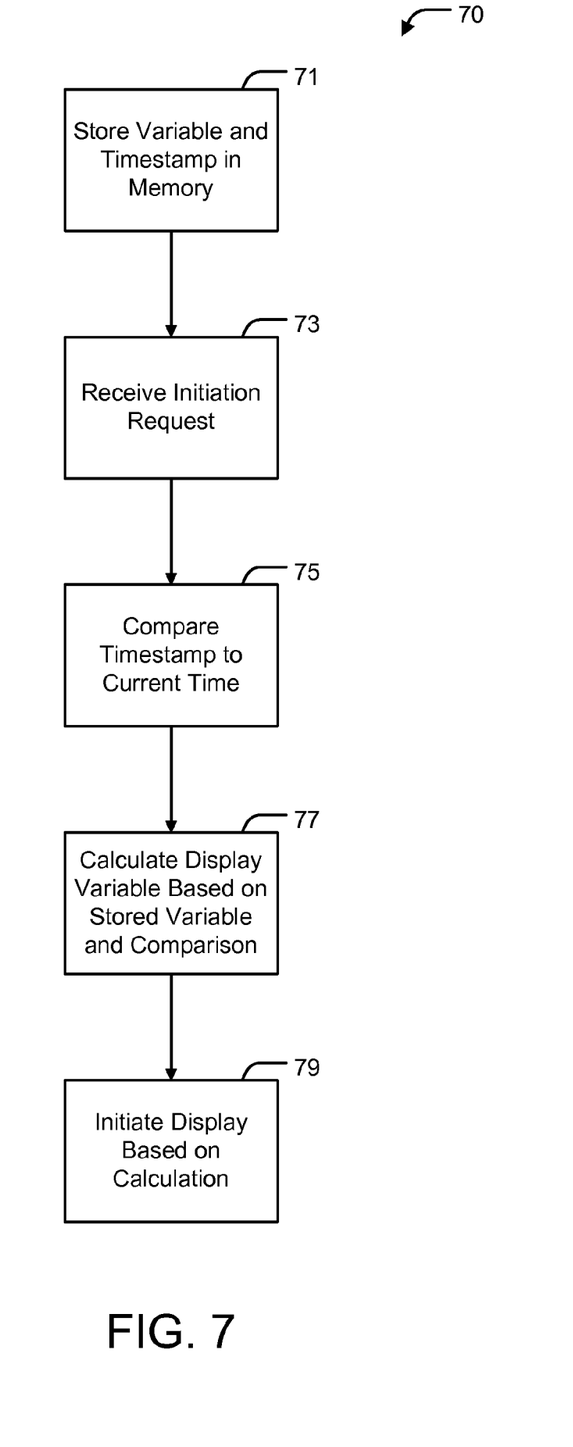
FIG. 7 is a flowchart of a method of initializing computer hardware from a power-off state, according to an exemplary embodiment of the invention.

Turning to FIG. 7, a flowchart of a method 70 of initializing computer hardware from a power-off state to a power-on state, according to an exemplary embodiment of the invention, is provided. The method 70 includes storing a variable (such as a current temperature reading) and a timestamp in a memory during system deactivation (such as during a power-down operation) at block 71. The block 71 may be triggered by a period of inactivity of the computer hardware or a lack of user interaction.

The method 70 further includes receiving a request to initiate or power-on a device, display, or computer hardware from a standby, low-power, and/or power-off state at block 73. The request may be generated by a user interacting with a computer, for example, by moving a mouse or depressing a key. Upon receipt, the method 70 includes comparing the timestamp to a current time at block 75 to determine a lapsed amount of time.

Thereafter, the method 70 includes a block 77 for calculating a value for a variable (such as temperature) based on the stored variable and the lapsed amount of time. For example, if a large amount of time has passed, the temperature may be estimated to be near a default, or equilibrium condition. Alternatively, if a short amount of time has passed, the temperature may be estimated to be more than the default.

Upon calculation and estimation, the method 70 includes initiating the device, display, or computer hardware based on the calculation and estimation at block 79.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computer system, comprising:
    a device operative to be powered down to a power-off state depending upon an amount of user activity on the computer system; and
    a device controller in communication with the device and operative to initialize the device from the power-off state to a power-on state responsive to user activity on the computer system,
    wherein the device controller comprises at least one sensor device configured to determine a temperature of the device controller before the device enters the power-on state.

2. The computer system of claim 1, further comprising:
    a memory configured to store a time stamp associated with the power-off state.

3. The computer system of claim 2, wherein the device is configured to initialize into the power-on state based on the temperature of the device controller and the time stamp.

4. The computer system of claim 1, wherein the device controller is further configured to initialize the device into the power-on state according to a temperature band that is selected based on the temperature of the device controller before initializing the device.

5. The computer system of claim 1, wherein the at least one sensor device is accessible by the device controller when the device controller is active.

6. The computer system of claim 1, further comprising:
    a desktop computer housing, wherein the device and the device controller are contained within the desktop computer housing.

7. A method of initializing computer hardware from a power-off state to a power-on state, the method comprising:
    detecting, before initializing the computer hardware into the power-on state, a temperature of the computer hardware;
    comparing the detected temperature to a threshold; and
    initializing the computer hardware into the power-on state based on the comparing.

8. The method of claim 7, wherein the computer hardware is a display device.

9. The method of claim 7, wherein detecting the temperature comprises reading a sensor output from a sensor proximate the computer hardware.

10. The method of claim 7, wherein:
comparing the detected temperature comprises determining when the detected temperature is above the threshold; and
initializing the computer hardware according to a temperature band that is associated with the threshold.

11. The method of claim 10, further comprising:
storing a time stamp corresponding to the power-off state of the computer hardware.

12. The method of claim 7, wherein the computer hardware is a display device of a desktop computer.

13. An apparatus for controlling computer hardware, the apparatus comprising:
a processor; and
a memory configured to store instructions that when executed by the processor cause the apparatus to perform steps that include:
detecting, before the computer hardware enters a power-on state, a temperature of the apparatus;
comparing the detected temperature to at least one threshold; and
initializing the computer hardware into the power-on state based on the comparing.

14. The apparatus of claim 13, further comprising a sensor, wherein the steps further include: reading a sensor output from the sensor, and determining an elapsed time since the computer hardware was in a power-off state.

15. The apparatus of claim 14, wherein the memory is further configured to store a time stamp associated with a power-off state of the computer hardware.

16. The apparatus of claim 15, wherein the steps further include:
determining, using the time stamp, a period since a most recent power-off state, wherein the initializing of the computer hardware is based on the period.

17. The apparatus of claim 13, wherein the steps further include:
comparing the detected temperature to the at least one threshold comprises determining when the detected temperature is above the threshold; and
initializing the computer hardware comprises initializing the computer hardware based on operational characteristics associated with an elevated value of temperature when the detected value is above the threshold.

18. The apparatus of claim 13, wherein initializing the computer hardware includes selecting a subroutine to execute based on the detected temperature of the apparatus before initializing the computer hardware into the power-on state.

19. The apparatus of claim 13, wherein the apparatus is a timing controller having an embedded temperature sensor disposed in a die thereof.

20. The apparatus of claim 19, wherein the computer hardware is a display device of a computer.

* * * * *